(12) United States Patent
Tran et al.

(10) Patent No.: US 11,760,067 B2
(45) Date of Patent: Sep. 19, 2023

(54) MULTILAYER ELEMENT COMPRISING AN INTERLAYER COMPRISING A COPOLYMER OF ETHYLENE WITH A COMONOMER CONTAINING SILANE GROUP(S)

(71) Applicant: Borealis AG, Vienna (AT)

(72) Inventors: Anh Tuan Tran, Linz (AT); Jeroen Oderkerk, Stenungsund (SE); Francis Costa, Linz (AT); Leonardus Welzen, Urmond (NL); Udo Wahner, Linz (AT); Denis Yalalov, Stenungsund (SE); Qizheng Dou, Linz (AT)

(73) Assignee: Borealis AG, Vienna (AT)

( * ) Notice: Subject to any disclaimer, the term of this patent is extended or adjusted under 35 U.S.C. 154(b) by 337 days.

(21) Appl. No.: 16/489,798

(22) PCT Filed: Jan. 18, 2018

(86) PCT No.: PCT/EP2018/051199
§ 371 (c)(1),
(2) Date: Aug. 29, 2019

(87) PCT Pub. No.: WO2018/171951
PCT Pub. Date: Sep. 27, 2018

(65) Prior Publication Data
US 2020/0009839 A1   Jan. 9, 2020

(30) Foreign Application Priority Data
Mar. 23, 2017  (EP) .................................... 17162671

(51) Int. Cl.
*B32B 17/10* (2006.01)
*B32B 27/08* (2006.01)
(Continued)

(52) U.S. Cl.
CPC .. *B32B 17/10743* (2013.01); *B32B 17/10036* (2013.01); *B32B 27/08* (2013.01);
(Continued)

(58) Field of Classification Search
CPC ........ B32B 17/10743; B32B 17/10036; B32B 27/08; B32B 27/308; C08L 23/08; C08L 2312/08
(Continued)

(56) References Cited

U.S. PATENT DOCUMENTS

2003/0212226 A1* 11/2003 Ittel ...................... C08F 210/02
526/279
2011/0088777 A1   4/2011 Becker et al.
(Continued)

FOREIGN PATENT DOCUMENTS

CN   1520431 A   8/2019
EP   736065      5/2003
(Continued)

OTHER PUBLICATIONS

English Translation of Office Action for Japanese Patent Application No. 2019-545761 dated May 27, 2021, 6 pages.
(Continued)

*Primary Examiner* — Michael M. Bernshteyn
(74) *Attorney, Agent, or Firm* — Lowenstein Sandler LLP

(57) ABSTRACT

The present invention relates to a multilayer element (LE), the use of the multilayer element (LE) for producing an article, an article comprising multilayer element (LE), a layer element of at least two layers, the use of the polymer composition of the invention to produce a multilayer element, as well as to a process for producing the multilayer element (LE) and an article thereof.

16 Claims, 2 Drawing Sheets

Figure 1:
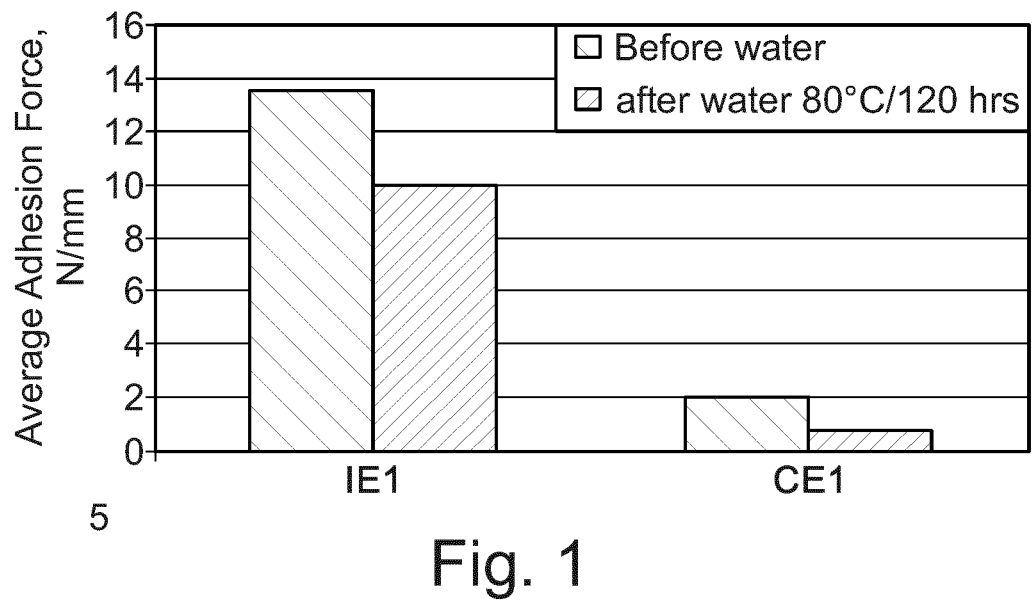

(51) Int. Cl.
*B32B 27/30* (2006.01)
*C08L 23/08* (2006.01)
(52) U.S. Cl.
CPC ............ *B32B 27/308* (2013.01); *C08L 23/08* (2013.01); *C08L 2312/08* (2013.01)
(58) Field of Classification Search
USPC ........................................................ 428/441
See application file for complete search history.

(56) References Cited

U.S. PATENT DOCUMENTS

| | | |
|---|---|---|
| 2011/0168239 A1 | 7/2011 | Weaver et al. |
| 2013/0174907 A1 | 7/2013 | Murasawa et al. |
| 2013/0213476 A1 | 8/2013 | Otsuka et al. |
| 2017/0240672 A1* | 8/2017 | Costa .................. H01L 31/0481 |
| 2017/0283566 A1* | 10/2017 | Costa .................. C08K 5/3435 |

FOREIGN PATENT DOCUMENTS

| | | |
|---|---|---|
| EP | 1309631 A1 | 5/2003 |
| EP | 1309632 A1 | 5/2003 |
| EP | 2144301 A1 | 1/2010 |
| EP | 3371265 A1 | 9/2018 |
| JP | H04261842 A | 9/1992 |
| JP | 2002009309 A | 1/2002 |
| JP | 2003026104 A * | 1/2003 |
| JP | 2003046104 A | 2/2003 |
| JP | 2010249895 A | 11/2010 |
| JP | 201173943 A | 4/2011 |
| JP | 2012241169 A | 12/2012 |
| JP | 2013528951 A | 7/2013 |
| WO | 1995016005 | 6/1995 |
| WO | WO-9516005 A1 * | 6/1995 .......... C09J 151/003 |
| WO | 2010090212 A1 | 8/2010 |
| WO | 2011160964 A1 | 12/2011 |
| WO | 2012087441 A1 | 6/2012 |
| WO | WO-2012087441 A1 * | 6/2012 .......... B01J 31/0225 |
| WO | 2016041922 A1 | 3/2016 |
| WO | 2016041946 A1 | 3/2016 |

OTHER PUBLICATIONS

English Translation of Notice of Reasons for Rejection for Japanese Patent Application No. 2019-545761 dated Oct. 13, 2020, 5 pages.
Office Action for EP18701308.1 dated Dec. 12, 2020, 7 pages.
Encyclopediua of Polymer Science and Engineering, vol. 6 (1986), pp. 383-410.
Encyclopedia of Materials; Science and Technology, 2001 Elsevier Science Ltd.: Polyethylene: High-pressure, R. Klimesch, D. Littman and F.-O. Mahling pp. 7181-7184.
Zweifel, et al., "Plastic Additives Handbook", 5th edition, Hanser Publications, 2001, pp. 966-991.
Randall, et al., "A Review of High Resolution Liquid 13Carbon Nuclear Magnet Resonance Characterizations of Ethylene-Based Polymers", Rev. Macromol. Chem. Phys. 1989, C29, pp. 201-317.
Heino et al., "Rheological Characterization of Polyethylene Fractions", Theoretical and Applied Rheology, Proc. XIth Int. Congr. on Rheology, Brussels, Belgium, Aug. 17-21, 1992, pp. 360-362.
Heino, et al.,"The Influence of Molecular Structure on Some Rheological Properties of Polyethylene", Annual Transactions of the Nordic Rheology Society, 1995, pp. 71-73.
Definition of terms relating to the non-ultimate mechanical properties of polymers, Pure & Appl. Chem. vol. 70, No. 3, pp. 701-754, 1998.
International Search Report and Written Opinion for PCT/EP2018/051199 dated Apr. 9, 2018, 18 pages.
English Translation of Decision on Reasons for Rejections for TW Patent Application No. 10820040850 dated Aug. 23, 2018, 5 pages.

* cited by examiner

MULTILAYER ELEMENT COMPRISING AN INTERLAYER COMPRISING A COPOLYMER OF ETHYLENE WITH A COMONOMER CONTAINING SILANE GROUP(S)

CROSS-REFERENCE TO RELATED APPLICATION(S)

This application is a national phase of International Application No. PCT/EP2018/051199, filed on Jan. 18, 2018, which claims the benefit of European Patent Application No. 17162671.6, filed on Mar. 23, 2017. The contents of these applications are hereby incorporated by reference in their entirety.

TECHNICAL FIELD

The present invention relates to a multilayer element (LE) for use in a safety layer element, an insulation element or a thermal layer element, or in any combination thereof, an article comprising the multilayer element (LE), a layer element of at least two layers, the use of the polymer composition of the invention to produce the multilayer element (LE) and an article thereof, as well as to a process for producing the multilayer element (LE) and the article thereof.

BACKGROUND ART

For instance in construction applications, like building applications, different type of layer elements are used including facade, window, wall and door elements. These layer elements may be designed to have various features, like protective, i.e. safety, insulation and/or thermal feature, just as an example.

Elements with safety functionality include so called "safety glass" elements of various types for use in various applications. "Safety glass" means herein a laminated glass layer element or a laminated polymeric layer element, typically a laminated glass layer element, with additional safety feature which makes it less likely to break, or if breaks, then typically holds together when shattered.

Laminated glass, such as safety glass, can be e.g. a layer element comprising typically a first rigid layer, at least an interlayer and a second layer, in that order. The first rigid layer and optionally (and conventionally) the second layer are typically layer(s) of a glass material or of a rigid polymeric material, like polycarbonate. The interlayer between said first and second rigid layer is often based on polyvinyl butyral (PVB) or ethylene-vinyl acetate (EVA).

When the first and/or second layer element (typically of glass material) break(s), then the interlayer element should hold/support/bond the first layer element and the second layer element together (bonded). I.e. the interlayer element has an adhering function, namely prevents the first and/or second layer element from breaking up into large sharp pieces.

Accordingly, safety glass is normally used when there is a possibility of human impact or where the glass could fail if shattered.

The use of PVB as interlayer material may have a drawback of being sensitive to moisture and usually requires a special controlled storage conditions (temperature and humidity). Moreover, due to moisture sensitivity the adhesion properties may be impaired.

In case of EVA as interlayer material, EVA must usually have high VA content to get feasible flowability/processability behavior. The conventional EVA with high VA content has then also very high MFR2 (more than 15 g/10 min).

For instance the laminated glass layer element for applications for vehicle, building and construction, architectural glasses, interior/exterior design applications, (usually of glass or non-flexible polymeric material) is typically produced by laminating the layer elements together. For the production of architectural and automotive laminated safety glass with a polymer material interlayer, like PVB interlayer, direct pressing of the loosely placed sandwich glass/film/glass is not a suitable method to produce said laminated safety glass without air inclusions. For example, the lamination of safety glass with PVB as interlayer is mostly done in two production steps to eliminate any air inclusions in the final product. The first step, so-called pre-lamination, is processed prior to the actual heating-pressing step. The quality of this pre-lamination is of major importance for the quality of the final laminated glass. A distinction is made in pre-lamination between rolling press and the vacuum process. The latter is subdivided into the vacuum bag process and the vacuum-ring process. During the second step, these pre-laminated constructions are then heated under pressure in an autoclave or oven, to achieve the final bounded product. Lamination process in case of PVB requires high temperature and long duration.

The properties of the chosen layer materials may also not be sufficient to meet overall property requirements needed for a safety, insulation and/or thermal layer element at end use of the end use thereof.

Accordingly, there is a continuous need for solutions of layer elements suitable for use in demanding safety, insulation and/or thermal end applications, like safety glass applications, to meet the challenging requirements for industrially applicable solutions.

FIGURES

FIG. 1 shows the better adhesion strength of layer element of the invention (IE1) comprising the interlayer element of the invention before and after water immersion compared to comparative layer element (CE1) comprising the prior art interlayer element (PVB).

Figure 2:
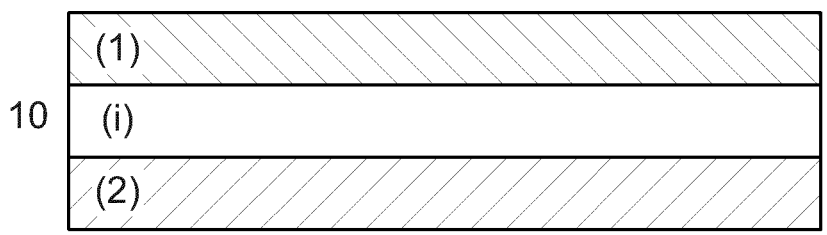

FIG. 2 illustrates the most preferable embodiment of the layer element (LE) of the invention, wherein the surface of the interlayer layer element (i) facing the surface of the first layer element (1) are in direct contact with each other and preferably without any adhesive layer(s) in between; and, on the opposite side of the interlayer element (i), the surface of the interlayer layer element (i) facing the surface of the second layer element (2) are in direct contact with each other and preferably without any adhesive layer(s) in between.

Figure 3:
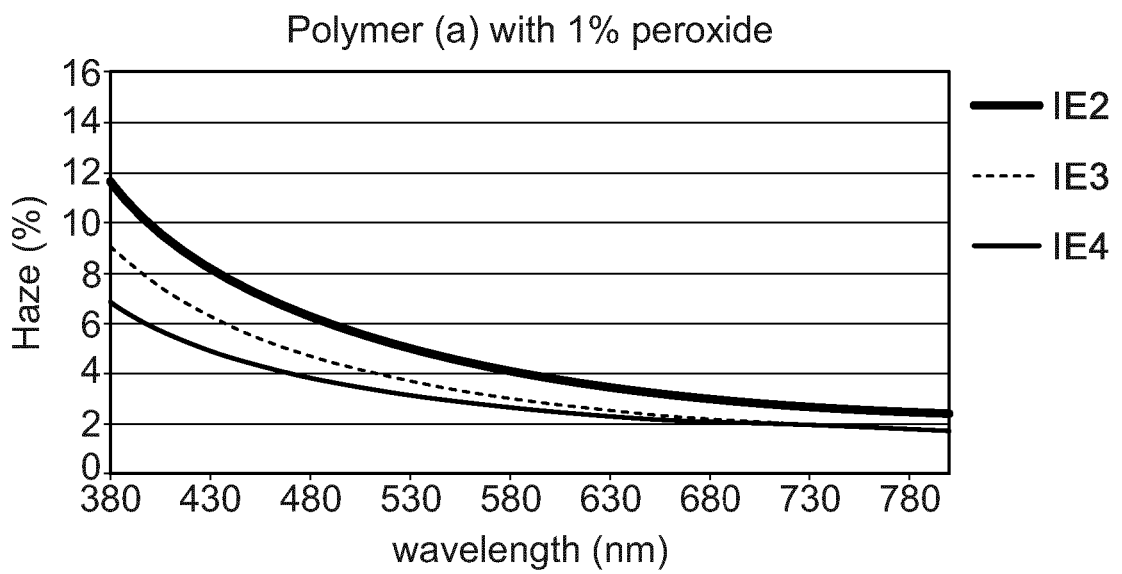
Figure 4:
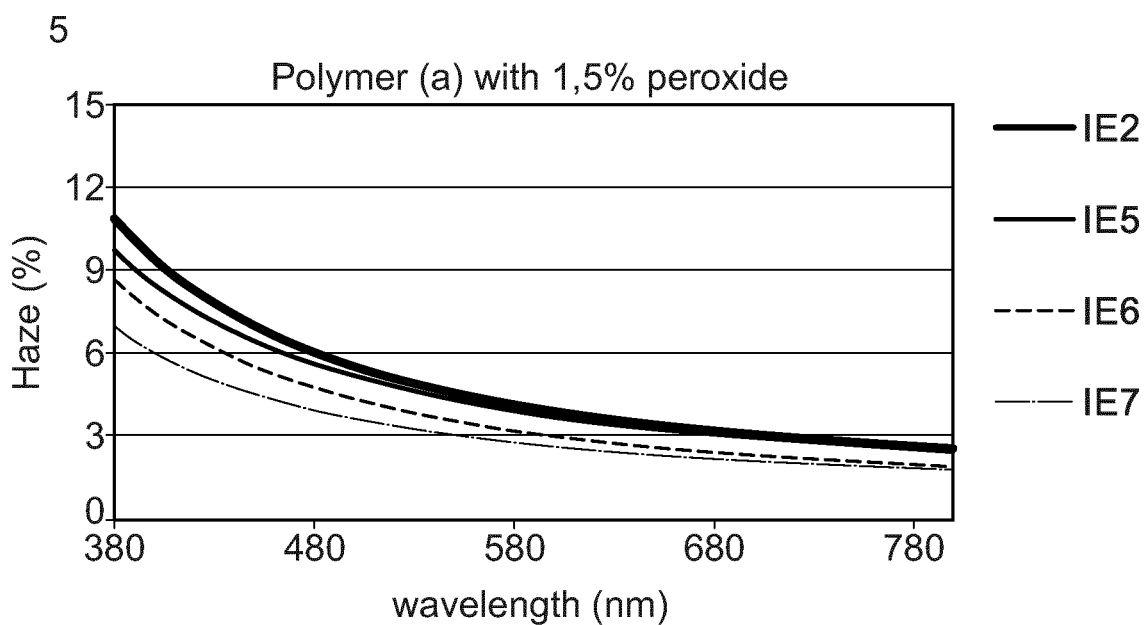

FIGS. 3 and 4 show the haze performance of multilayer elements (LE) comprising cross-linked and non-crosslinked interlayer elements according to the present invention as a graph of the haze over a wavelength range of 380 nm to 800 nm.

THE DESCRIPTION OF THE INVENTION

Accordingly, the present invention is directed to a multilayer element (LE) comprising a first layer element, an interlayer element and a second layer element, in the given order, wherein the first layer element comprises a glass layer or a polymeric layer;

the interlayer element comprises a polymer composition comprising a copolymer of ethylene (a) which is selected from (a1) a copolymer of ethylene with silane group(s) containing comonomer; or (a2) a copolymer of ethylene with one or more polar comonomer(s) selected from (C1-C6)-alkyl acrylate or (C1-C6)-alkyl (C1-C6)-alkylacrylate comonomer(s), which copolymer (a2) bears silane group(s) containing units and which copolymer (a2) is different from the copolymer (a1); and the second layer element comprises a glass layer or a polymeric layer;

and wherein the interlayer element is in adhering contact with said first and second layer element.

The multilayer element (LE) as defined above, below or in the claims can be used for any purposes needed e.g. in construction, building or vehicles, like as a safety layer element, an insulation layer element or a thermal layer element, or in any combination thereof.

Consequently, the multilayer element (LE) of the invention preferably has at least one of safety, insulation or thermal feature in that the multilayer element (LE) meets demanding requirements for use as part or as such in a safety, insulation and/or thermal layer element applications.

The multilayer element (LE), as defined above, below or in claims, is referred herein also shortly as "layer element (LE)".

The first layer element and, respectively, the second layer element of the multilayer element (LE) as defined above, below or in claims, are referred herein also as the "first layer element" and as the "second layer element".

The expression "the interlayer element is in adhering contact with said first and second layer element" means herein in that the outmost surface of the interlayer element adhering to the outmost surface of the first layer element and, respectively, the outmost surface of the interlayer element adhering to the outmost surface of the second layer element can be in direct adhering contact or, alternatively, there can be an adhesive layer between the adhering surface of the interlayer element and one or both of the first layer element and the second layer element.

The expression "element" in said first layer element, in said second layer element and in said interlayer element refers in this application to different functionalities of these layer components, namely said first and second layer element have independently one or more functions related to the end use of the multilayer element, such as e.g. safety, insulation and/or thermal function, whereas the interlayer element has differing, i.e. adhering, function. Meaning of safety element is already given above under background art. The insulation element includes acoustic (sound) insulation element or thermal insulation element as known in the art. The insulation element can also have both acoustic and thermal functionalities. The thermal element can be provided e.g. with heating means, like electrical wires. The heating is then effected by conducting electric current to said wires. Example of a combination of safety and thermal element is e.g. front window (windscreen) in vehicles, like cars, which is provided with heating means and also functions as safety glass.

The copolymer of ethylene (a), as defined above, below or in claims, is referred herein also shortly as "polymer (a)" or "copolymer (a)".

The definition (a1) a copolymer of ethylene with silane group(s) containing comonomer, as defined above, below or in claims, is referred herein also shortly as "copolymer of ethylene (a1)", "copolymer (a1)" or "polymer (a1)". The definition (a2) a copolymer of ethylene with one or more polar comonomer(s) selected from (C1-C6)-alkyl acrylate or (C1-C6)-alkyl (C1-C6)-alkylacrylate comonomer(s), which copolymer (a2) bears silane group(s) containing units and which copolymer (a2) is different from the copolymer (a1), as defined above, below or in claims, is referred herein also shortly as "copolymer of ethylene (a2)", "copolymer (a2)" or "polymer (a2)".

As well known "comonomer" refers to copolymerisable comonomer units.

The claimed specific interlayer element comprising the copolymer (a) of the layer element (LE) of the invention has superior adhesion properties to the first and second layer element and, preferably, is also non-moisture sensitive. Due to non-moisture sensitive properties the interlayer element can be stored at ambient temperature before the production of the layer element (LE) without sacrificing said beneficial adhesion properties at time of the production of said layer element (LE). Moreover, the advantageous property balance of the interlayer element is maintained at the end use of the final layer element (LE). As a result the layer element (LE) of the invention is highly suitable in various end application articles for instance for use in any one, two or all of the safety, insulation or thermal elements, wherein the interlayer element must provide sufficient adhesion properties for the element to meet demanding requirements needed for the end application, like, without limiting to, safety, insulation or thermal elements, or for any combinations thereof.

Additionally, the interlayer element of the invention also contributes to the production process, for instance lamination process, for producing the layer element (LE) or article thereof. Namely, the handling, e.g. storing, of the polymer (a) and also of interlayer element of the invention comprising said polymer (a) is easier compared to prior art interlayer materials, like PVB, since no special storage conditions are needed. Moreover, e.g. the lamination process of the layer element (LE) of the invention can be carried out at lower temperatures and shorter duration compared to lamination process of prior art layer element materials, like PVB. As a result, a higher output rate of the lamination process compared to the current solutions can be achieved, if desired. Accordingly, due to easy material handling and lower production temperatures the overall process can be simplified.

The interlayer element of the multilayer element (LE) has also very advantageous optical properties, like feasible low haze property.

Moreover, the polymer composition of interlayer element of the multilayer element (LE) is crosslinkable, if crosslinking is desired. In crosslinking application, lower temperatures can be used during the production process, therefore any premature crosslinking of the polymer composition of the interlayer element can be reduced or avoided. Preferably, the crosslinking of the interlayer element further improves the optical properties, such as haze, of the multilayer element (LE). Thus the interlayer element of the invention can provide a consistent adhesion between the layers of the multilayer element and good quality to the final multilayer element (LE), which prolongs the life of the end article. In this crosslinking embodiment for further improving haze performance, the used crosslinking agent is preferably peroxide.

In a specific embodiment, the present invention relates to a laminated glass layer element (GLE) comprising a first glass layer element, an interlayer element and a second glass layer element, in the given order, wherein
the interlayer element comprises a polymer composition comprising a copolymer of ethylene (a) which is selected from
- (a1) a copolymer of ethylene with silane group(s) containing comonomer; or
- (a2) a copolymer of ethylene with one or more polar comonomer(s) selected from (C1-C6)-alkyl acrylate or (C1-C6)-alkyl (C1-C6)-alkylacrylate comonomer(s), which copolymer (a2) bears silane group(s) containing units and which copolymer (a2) is different from the copolymer (a1); and the interlayer element is in adhering contact with said first glass layer element and said second glass layer element.

The invention also provides a use of the polymer composition as defined above, below or in claims, for producing a multilayer element (LE) or an article comprising the multilayer element (LE).

The invention also provides a use of the polymer composition as defined above, below or in claims, for producing a laminated glass layer element (GLE) or an article comprising the laminated glass layer element (GLE).

The invention further provides a use of the polymer composition of the invention for producing a multilayer element (LE), as defined above, below or in claims, a use of said multilayer element (LE) for producing an article comprising said multilayer element (LE).

The invention further provides a use of the polymer composition of the invention for producing a laminated glass layer element (GLE), as defined above, below or in claims, a use of said laminated glass layer element (GLE) for producing an article comprising said laminated glass layer element (GLE).

The invention further provides an article comprising the multilayer element (LE) as defined above, below or in claims.

The invention further provides an article comprising the laminated glass layer element (GLE) as defined above, below or in claims.

The invention further provides the use of the multilayer element (LE) as defined above, below or in claims or of the laminated glass element (GLE) as defined above, below or in claims for producing an article comprising the multilayer element (LE) or the laminated glass layer element (GLE), for construction applications, like elements in buildings, for instance architectural elements, such as exterior/interior elements, like facades outside the building, window elements, door elements or indoor wall elements; for elements in bridges; for elements in vehicles, such as windows in cars, trains, airplanes or ships; for elements in production equipments, like safety windows in machines; for elements in household devices; for projection applications, like head-up displays, or for elements in furniture etc.

The invention further provides an article, as defined above, below or in claims, which is an article for construction applications, like elements in buildings, for instance architectural elements, such as exterior/interior elements, like facades outside the building, window elements, door elements or indoor wall elements; for elements in bridges; for elements in vehicles, such as windows in cars, trains, airplanes or ships; for elements in production equipments, like safety windows in machines; for elements in production equipments, like safety windows in machines; for elements in household devices; for projection applications, like head-up displays, or for elements in furniture etc., preferably, which is an article selected from a safety layer element, an insulation layer element or a thermal layer element, or any combination thereof, preferably an article which is a safety layer element, an insulation layer element or a thermal layer element, or any combination thereof consisting of the multilayer element (LE) or the laminated glass element (GLE). In one preferable embodiment the article is a safety layer element, preferably a safety glass element. Such safety layer element can additionally have other functionalities, like one or both of insulation and thermal functionality.

The invention further provides a process for producing the multilayer element (LE) of the invention.

The invention further provides a process for producing the laminated glass layer element (GLE) of the invention.

The invention further provides a process for producing an article of the invention. The multilayer element (LE), the laminated glass layer element (GLE), the interlayer element, the polymer composition, the polymer (a) thereof, the first and second layer elements, the article and process for producing the layer element (LE) and article thereof, as well as the article and process for producing the laminated glass layer element (GLE) and article thereof together with further details, preferred embodiments, ranges and properties thereof, are described below and in claims, which preferred embodiments, ranges and properties can be in any combination and combined in any order.

The Interlayer Element of the Multilayer Element (LE)

The interlayer layer element comprises a layer which comprises, preferably consists of, a polymer composition comprising the polymer (a). The polymer composition is referred herein also shortly as "the composition" or "the composition of the invention". The interlayer layer element may comprise two or more layers which comprises, preferably consists of, a polymer composition comprising the polymer (a). If such layers of polymer composition of the invention are adjacent, then they are considered as a monolayer, since fused together by before solidification of such layers during the production process of the layer element.

The silane group(s) containing units are incorporated to the backbone (polymer chains) of polymer (a). The silane group(s) containing units can be present as a comonomer of the polymer (a) or as a compound grafted chemically to the polymer (a).

Accordingly, in case of silane group(s) containing units are incorporated to the polymer (a) as a comonomer, the silane group(s) containing units are copolymerized as comonomer with ethylene monomer during the polymerization process of polymer (a). In case the silane group(s) containing units are incorporated to the polymer by grafting, the silane group(s) containing units are reacted chemically (also called as grafting), with the polymer (a) after the polymerization of the polymer (a). The chemical reaction, i.e. grafting, is performed typically using a radical forming agent such as peroxide. Such chemical reaction may take place before or during the lamination process of the invention. In general, copolymerisation and grafting of the silane group(s) containing units to ethylene are well known techniques and well documented in the polymer field and within the skills of a skilled person.

It is also well known that the use of peroxide in the grafting embodiment decreases the melt flow rate (MFR) of an ethylene polymer due to a simultaneous crosslinking reaction. As a result, the grafting embodiment can bring limitation to the choice of the MFR of polymer (a) as a starting polymer, which choice of MFR can have an adverse impact on the quality of the polymer at the end use application. Furthermore, the by-products formed from peroxide during the grafting process can have an adverse impact on use life of the polymer composition at the end use application.

The copolymerisation of the silane group(s) containing comonomer into the polymer backbone provides more uniform incorporation of the units compared to grafting of the units. Moreover, compared to grafting, the copolymerisation does not require the addition of peroxide after the polymer is produced.

Accordingly, the silane group(s) containing units are preferably present in polymer (a) as a comonomer, i.e. incorporated to the polymer (a1) as a comonomer with the ethylene monomer, and in case of the polymer (a2), as a comonomer together with the polar comonomer and ethylene monomer. Polymer (a2) thus contains two different comonomers, the silane group(s) containing comonomer and the polar comonomer, as defined above, below or in claims.

"Silane group(s) containing comonomer" means herein above, below or in claims that the silane group(s) containing units are present as a comonomer.

The silane group(s) containing comonomer of copolymer of ethylene (a1) and the silane group(s) containing unit or, preferably, the silane group(s) containing comonomer of copolymer of ethylene (a2), is preferably a hydrolysable unsaturated silane compound represented by the formula (I):

$$R^1SiR^2_qY_{3-q} \qquad (I)$$

wherein
$R^1$ is an ethylenically unsaturated hydrocarbyl, hydrocarbyloxy or (meth)acryloxy hydrocarbyl group,
each $R^2$ is independently an aliphatic saturated hydrocarbyl group,
Y which may be the same or different, is a hydrolysable organic group and
q is 0, 1 or 2;

Further suitable silane group(s) containing comonomer is e.g. gamma-(meth)acryl-oxypropyl trimethoxysilane, gamma(meth)acryloxypropyl triethoxysilane, and vinyl triacetoxysilane, or combinations of two or more thereof.

One suitable subgroup of compound of formula (I) is an unsaturated silane compound or, preferably, comonomer of formula (II)

$$CH_2=CHSi(OA)_3 \qquad (II)$$

wherein each A is independently a hydrocarbyl group having 1-8 carbon atoms, suitably 1-4 carbon atoms.

The silane group(s) containing unit, or preferably, the comonomer, of the invention, is preferably the compound of formula (II) which is vinyl trimethoxysilane, vinyl bismethoxyethoxysilane, vinyl triethoxysilane, more preferably vinyl trimethoxysilane or vinyl triethoxysilane.

The amount (mol %) of the silane group(s) containing units present in the polymer (a), preferably present as comonomer, is preferably of 0.01 to 2.0 mol %, preferably 0.01 to 1.00 mol %, suitably from 0.05 to 0.80 mol %, suitably from 0.10 to 0.60 mol %, suitably from 0.10 to 0.50 mol %, when determined according to "Comonomer contents" as described below under "Determination Methods".

In one preferable embodiment A1, the polymer (a) is the copolymer of ethylene with silane group(s) containing comonomer (a1). In this embodiment A1, the polymer (a1) does not contain, i.e. is without, a polar comonomer as defined for polymer (a2). Preferably the silane group(s) containing comonomer is the sole comonomer present in the polymer (a1). Accordingly, the copolymer (a1) is preferably produced by copolymerising ethylene monomer in a high pressure polymerization process in the presence of silane group(s) containing comonomer using a radical initiator. Preferably the silane group(s) containing comonomer is the only comonomer present in the copolymer of ethylene (a1).

In said one preferable embodiment (A1), the polymer (a1) is preferably a copolymer of ethylene with silane group(s) containing comonomer according to formula (I), more preferably with silane group(s) containing comonomer according to formula (II), more preferably with silane group(s) containing comonomer according to formula (II) selected from vinyl trimethoxysilane, vinyl bismethoxyethoxysilane, vinyl triethoxysilane or vinyl trimethoxysilane comonomer, as defined above or in claims. Most preferably the polymer (a1) is a copolymer of ethylene with vinyl trimethoxysilane, vinyl bismethoxyethoxysilane, vinyl triethoxysilane or vinyl trimethoxysilane comonomer, preferably with vinyl trimethoxysilane or vinyl triethoxysilane comonomer, preferably with vinyl trimethoxysilane.

In another preferable embodiment (A2), the polymer (a) is the polymer (a2) which contains one or more polar comonomer(s) selected from $(C_1-C_6)$-alkyl acrylate comonomer(s) or $(C_1-C_6)$-alkyl $(C_1-C_6)$-alkylacrylate comonomer(s) and which bears silane group(s) containing units. Preferably, the polymer (a2) contains one or more polar comonomer(s) selected from $(C_1-C_6)$-alkyl acrylate comonomer(s) or $(C_1-C_6)$-alkyl $(C_1-C_6)$-alkylacrylate comonomer(s) and with silane group(s) containing comonomer. Preferably, the polar comonomer of the polymer (a2) is selected from one of $(C_1-C_6)$-alkyl acrylate comonomer, preferably from methyl acrylate, ethyl acrylate or butyl acrylate comonomer. More preferably, the polymer (a2) is a copolymer of ethylene with a polar comonomer selected from methyl acrylate, ethyl acrylate or butyl acrylate comonomer and with silane group(s) containing comonomer. The polymer (a2) is most preferably a copolymer of ethylene with a polar comonomer selected from methyl acrylate, ethyl acrylate or butyl acrylate comonomer and with silane group(s) containing comonomer of compound of formula (I). Preferably, in this embodiment the polar comonomer and the preferable silane group(s) containing comonomer are the only comonomers present in the copolymer of ethylene (a2).

The content of the polar comonomer present in the polymer (a2) is preferably of 0.5 to 30.0 mol %, suitably 2.5 to 20.0 mol %, preferably of 4.5 to 18 mol %, preferably of 5.0 to 18.0 mol %, when measured according to "Comonomer contents" as described below under the "Determination methods".

In said another preferable embodiment (A2), the polymer (a2) is a copolymer of ethylene with the polar comonomer, as defined above, below or in claims, and with silane group(s) containing comonomer according to formula (I), more preferably with silane group(s) containing comonomer according to formula (II), more preferably with silane group(s) containing comonomer according to formula (II) selected from vinyl trimethoxysilane, vinyl bismethoxyethoxysilane, vinyl triethoxysilane or vinyl trimethoxysilane comonomer, as defined above or in claims. Preferably the polymer (a2) is a copolymer of ethylene with methyl acrylate, ethyl acrylate or butyl acrylate comonomer and with vinyl trimethoxysilane, vinyl bismethoxyethoxysilane, vinyl triethoxysilane or vinyl trimethoxysilane comonomer, preferably with vinyl trimethoxysilane or vinyl triethoxysilane comonomer. More preferably the polymer (a2) is a copolymer of ethylene with methyl acrylate comonomer and with vinyl trimethoxysilane, vinyl bismethoxyethoxysilane, vinyl triethoxysilane or vinyl trimethoxysilane comonomer, preferably with vinyl trimethoxysilane or vinyl triethoxysilane comonomer, preferably with vinyl trimethoxysilane.

Accordingly, the polymer (a2) is most preferably a copolymer of ethylene with methyl acrylate comonomer together with silane group(s) containing comonomer as defined above, below or in claims, preferable a copolymer of ethylene with methyl acrylate comonomer and with vinyl trimethoxysilane or vinyl triethoxysilane comonomer, preferably with methyl acrylate comonomer and with vinyl trimethoxysilane comonomer.

Without binding to any theory, methyl acrylate (MA) is the only acrylate which cannot go through the ester pyrolysis reaction, since does not have this reaction path. Therefore, the polymer (a2) with MA comonomer does not form any harmful free acid (acrylic acid) degradation products at high temperatures, whereby polymer (a2) of ethylene and methyl acrylate comonomer contribute to good quality and life cycle of the end article thereof. This is not the case e.g. with vinyl acetate units of EVA, since EVA forms at high temperatures harmful acetic acid degradation products. Moreover, the other acrylates like ethyl acrylate (EA) or butyl acrylate (BA) can go through the ester pyrolysis reaction, and if degrade, could form volatile olefinic by-products.

The polymer (a) present in the interlayer element, enables, if desired, to decrease the MFR of the polymer (a) compared to prior art and thus offers higher resistance to flow during the production of the interlayer element and, particularly, of the layer element (LE) of the invention. As a result, the preferable MFR can further contribute, if desired, to the quality of the layer element (LE), and to an article thereof comprising the layer element (LE).

The melt flow rate, $MFR_2$, of the polymer composition, preferably of polymer (a), of the interlayer, is preferably less than 70 g/10 min, preferably 1.5 to 70 g/10 min, preferably 2.0 to 50 g/10 min, preferably 2.0 to 30 g/10 min, preferably from 2.0 to 13 g/10 min, preferably from 2.0 to 10 g/10 min, more preferably from 2.0 to 8 g/10 min (according to ISO 1133 at 190° C. and at a load of 2.16 kg).

The polymer composition, preferably of polymer (a), of the interlayer has preferably a Shear thinning index, $SHI_{0.05/300}$, of 30.0 to 100.0, preferably of 40.0 to 80.0, when measured according to "Rheological properties: Dynamic Shear Measurements (frequency sweep measurements)" as described below under "Determination Methods".

The preferable SHI range further contributes to the advantageous rheological properties of the polymer composition of the interlayer.

Accordingly, the combination of the preferable MFR range and the preferable SHI range of the polymer (a) of the interlayer further contributes to the quality of the interlayer and the layer element (LE) of the invention. As a result, the preferable MFR can further contribute, if desired, to the quality of the layer element (LE), and to an article thereof comprising the layer element (LE).

The composition, preferably the polymer (a), preferably has a melting temperature of 120° C. or less, preferably 110° C. or less, more preferably 100° C. or less and most preferably 95° C. or less, when measured according to ASTM D3418 as described under "Determination Methods". Preferably the melting temperature of the composition, more preferably the polymer (a) is 70° C. or more, more preferably 75° C. or more, even more preferably 78° C. or more, when measured as described below under "Determination Methods". The preferable melting temperature is beneficial for lamination process, since the time of the melting/softening step can be reduced.

Typically, and preferably the density of the composition, preferably of the polymer of ethylene (a), of the interlayer element is higher than 860 kg/m³. Preferably the density is not higher than 970 kg/m³, and more preferably is from 920 to 960 kg/m³, according to ISO 1872-2 as described below under "Determination Methods".

Preferred polymer (a) is a copolymer of ethylene (a1) with vinyl trimethoxysilane comonomer or a copolymer of ethylene (a2) with methylacrylate comonomer and with vinyl trimethoxysilane comonomer. The most preferred polymer (a) is a copolymer of ethylene (a2) with methylacrylate comonomer and with vinyl trimethoxysilane comonomer.

The polymer (a) of the composition can be e.g. commercially available or can be prepared according to or analogously to known polymerization processes described in the chemical literature.

In a preferable embodiment the polymer (a), i.e. polymer (a1) or (a2), is produced by polymerising ethylene suitably with silane group(s) containing comonomer (=silane group(s) containing units present as comonomer) as defined above, and in case of polymer (a2) also with the polar comonomer(s), in a high pressure (HP) process using free radical polymerization in the presence of one or more initiator(s) and optionally using a chain transfer agent (CTA) to control the MFR of the polymer. The HP reactor can be e.g. a well-known tubular or autoclave reactor or a mixture thereof, suitably a tubular reactor. The high pressure (HP) polymerisation and the adjustment of process conditions for further tailoring the other properties of the polymer depending on the desired end application are well known and described in the literature, and can readily be used by a skilled person. Suitable polymerisation temperatures range up to 400° C., suitably from 80 to 350° C. and pressure from 70 MPa, suitably 100 to 400 MPa, suitably from 100 to 350 MPa. The high pressure polymerization is generally performed at pressures of 100 to 400 MPa and at temperatures of 80 to 350° C. Such processes are well known and well documented in the literature and will be further described later below.

The incorporation of the comonomer(s), when present, including the preferred form of silane group(s) containing units as comonomer, to the ethylene monomer and the control of the comonomer feed to obtain the desired final content of said comonomer(s) can be carried out in a well-known manner and is within the skills of a skilled person.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

Such HP polymerisation results in a so called low density polymer of ethylene (LDPE), herein results in polymer (a1) or polymer (a2). The term LDPE has a well-known meaning in the polymer field and describes the nature of polyethylene produced in HP, i.e. the typical features, such as different branching architecture, to distinguish the LDPE from PE produced in the presence of an olefin polymerisation catalyst (also known as a coordination catalyst). Although the term LDPE is an abbreviation for low density polyethylene, the term is understood not to limit the density range, but covers the LDPE-like HP polyethylenes with low, medium and higher densities.

Below, the amounts "Based on the total amount (100 wt %) of the polymer composition of the invention" means that the amounts of the components present in the polymer composition of the invention total to 100 wt %.

In one embodiment of the composition of the invention suitably comprises additive(s). Preferably the composition comprises, preferably consists of, based on the total amount (100 wt %) of the composition, 90 to 99.9999 wt % of the polymer (a); and 0.0001 to 10 wt % of the additives, preferably 0.0001 and 5.0 wt %, like 0.0001 and 2.5 wt %, of the additives.

The optional additives are e.g. conventional additives suitable for the desired end application and within the skills of a skilled person, including without limiting to, preferably at least antioxidant(s) and UV light stabilizer(s), and may also include metal deactivator(s), clarifier(s), brightener(s), acid scavenger(s), pigment(s) as well as slip agent(s) etc. Each additive can be used e.g. in conventional amounts, the total amount of additives present in the polymer composition of the invention being preferably as defined above. Such additives are generally commercially available and are described, for example, in "Plastic Additives Handbook", 5th edition, 2001 of Hans Zweifel.

In a preferable embodiment the polymer composition consists of the polymer (a) as the only polymeric component (s). "Polymeric component(s)" exclude herein any carrier polymer(s) of optional additive, e.g. carrier polymer(s) used in master batch(es) of additive(s) optionally present in the composition. Such optional carrier polymer(s) are calculated to the amount of the respective additive based on the amount (100%) of the polymer composition.

Preferably the interlayer element comprises a layer consisting of the polymer composition of the invention. Preferably the interlayer element consists of the polymer composition of the invention.

The polymer composition of the interlayer element can be crosslinked, if desired. Thus, in one embodiment the polymer composition is crosslinkable. In one preferable embodiment the polymer composition of the interlayer element is crosslinked.

The optional crosslinking can be effect by using peroxide. In that case the peroxide is added to the composition before forming the interlayer element. I.e. in this embodiment the peroxide is present in the interlayer element before the crosslinking thereof. The peroxide can be any suitable commercial peroxide used for crosslinking purpose. Usually, the peroxide is any organic peroxide commercially available for crosslinking applications. As non-limiting examples e.g. peroxide is selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, tert-butylperoxy-2-ethylhexylcarbonate or mixtures thereof. The used amount of the peroxide depends on the desired crosslinking degree (gel content) the type of the peroxide and is within the skills of a skilled person. Typically, the amount of peroxide is in the range of from 0.01 to 5.0 wt %, preferably of from 0.05 to 3.0 wt %, more preferably of from 0.1 to 2.5 wt % and most preferably of from 0.5 to 2.0 wt %, based on the total weight of the polymer composition.

Alternatively, if desired, depending on the end application, the composition of the interlayer element of the layer element (LE) can be crosslinked via silane group(s) containing units using a silanol condensation catalyst (SCC), which is preferably selected from the group of carboxylates of tin, zinc, iron, lead or cobalt or aromatic organic sulphonic acids, before or during the lamination process of the invention. Such SCCs are for instance commercially available and can be chosen by a skilled person depending on the end application.

It is to be understood that the SCC as defined above and below are those silanol condensation catalysts which are conventionally supplied for the purpose of crosslinking The silanol condensation catalyst (SCC), which can optionally be present in the composition of the interlayer element of the layer element (LE), is more preferably selected from the group C of carboxylates of metals, such as tin, zinc, iron, lead and cobalt; from a titanium compound bearing a group which is hydrolysable to a Brönsted acid (preferably as described in WO 2011/160964 of Borealis, included herein as reference), from organic bases; from inorganic acids; and from organic acids; suitably from carboxylates of metals, such as tin, zinc, iron, lead and cobalt, from titanium compound bearing a group which is hydrolysable to a Brönsted acid as defined above or from organic acids, suitably from dibutyl tin dilaurate (DBTL), dioctyl tin dilaurate (DOTL), particularly DOTL; titanium compound bearing a group hydrolysable to a Brönsted acid as defined above; or an aromatic organic sulphonic acid, which is suitably an organic sulphonic acid which comprises the structural element:

$$Ar(SO_3H)_x \quad (III)$$

wherein Ar is an aryl group which may be substituted or non-substituted, and if substituted, then suitably with at least one hydrocarbyl group up to 50 carbon atoms, and x is at least 1; or a precursor of the sulphonic acid of formula (III) including an acid anhydride thereof or a sulphonic acid of formula (III) that has been provided with a hydrolysable protective group(s), e.g. an acetyl group that is removable by hydrolysis. Such organic sulphonic acids are described e.g. in EP736065, or alternatively, in EP1309631 and EP1309632.

In the embodiment where the composition of the interlayer element is crosslinked using silane condensation catalyst (SCC), the polymer composition of the interlayer element is crosslinked using a silane condensation catalyst (SCC) selected from the above SCC group of tin-organic catalysts or aromatic organic sulphonic acids. I.e. the composition of the interlayer element of the layer element (LE) comprises said silane condensation catalyst (SCC). In this context "comprises" means the SCC is present at least before the crosslinking occurs.

The amount of the optional crosslinking agent (SCC), if present, depends on the desired crosslinking degree (gel content) and the type of the used SCC. The amount of the optional crosslinking agent (SCC), if present, is preferably of 0 to 0.1 mol/kg, like 0.00001 to 0.1, preferably of 0.0001 to 0.01, more preferably 0.0002 to 0.005, more preferably of 0.0005 to 0.005, mol/kg polymer of ethylene (a).

In a preferred embodiment the composition comprises, preferably consists of, based on the total amount (100 wt %) of the composition, 85 to 99.99 wt % of the polymer (a) as defined above or below;

0.01 to 5.0 wt %, preferably of from 0.05 to 3.0 wt %, more preferably of from 0.1 to 2.5 wt % and most preferably of from 0.5 to 2.0 wt % of a crosslinking agent selected from a peroxide or a silanol condensation catalyst (SCC), both as defined above or below, and 0 to 10 wt % of the additives, preferably 0.0001 and 5.0 wt %, like 0.0001 and 2.5 wt %, of the additives s defined above or below.

In one preferable embodiment the polymer composition of the interlayer element of the multilayer element (LE) of the invention is crosslinked. In this embodiment, the polymer composition is preferably crosslinked using a silanol condensation catalyst (SCC) which is selected from the group of carboxylates of tin, zinc, iron, lead or cobalt or aromatic organic sulphonic acids; or crosslinked using peroxide.

Preferably the crosslinking is carried out using peroxide. In this embodiment the optical properties, like haze performance (low haze) can further be improved. The interlayer element is preferably an interlayer film, an interlayer sheet or an interlayer foil, most preferably an interlayer film.

Said interlayer element can be produced by extrusion, e.g. cast film or blown film extrusion, including coextrusion, using conventional extrusion equipment and extrusion conditions suitable for the desired end use of the interlayer element, which equipment and conditions can be selected by a skilled person. Alternatively said interlayer element can be produced by lamination using conventional lamination equipment and conditions suitable for the desired end use of the interlayer element, which equipment and conditions can be selected by a skilled person. Furthermore, said inter layer element may be produced using the combination of extrusion and lamination, as well known by a skilled person.

The interlayer element is preferably the sole polymeric layer element between the first and second layer element. Preferably the interlayer element consists of one layer (monolayer element). Accordingly, the inter layer element is most preferably a monolayer element. The term "monolayer element" is understood herein as a single layer consisting of the polymer composition of the interlayer element of invention. I.e. "Single layer" means one or more layers, wherein in case of more layers, the layers consist of the polymer composition of the invention and are fused together resulting in one layer (monolayer). Accordingly said monolayer element as said interlayer element can be one layer (monolayer). Or alternatively, said monolayer element as said interlayer element can be produced by combination of two or more layers of the polymer composition of the invention which layers are then fused together (adhered) during the production process of the interlayer element. The layers can be produced e.g., by coextrusion or, alternatively, by extrusion and subsequent lamination. The one layer is typically produced by extrusion. The preferred interlayer element is mono layer element, wherein the layer(s) consist of the polymer composition of the invention.

The interlayer element, preferably the interlayer element as monolayer element may contain non-polymeric elements, like reinforcing material, such as wire web, which non-polymeric material may be embedded to the interlayer element for instance during the production of the interlayer element.

In one embodiment, the interlayer element, which is preferably a monolayer element, contains non-polymeric elements selected reinforcing elements, thermal elements or electrically active elements, or any combinations thereof.

In a further embodiment, the interlayer element, which is preferably a monolayer element, contains non-polymeric elements selected from reinforcing elements or thermal elements which are used in safety glass elements or thermal elements, or in any combinations thereof.

In a further embodiment, the interlayer element is a monolayer element and does not contain any non-polymeric elements as defined above.

The First and Second Layer Element of the Multilayer Element (LE)

The first layer element or the second layer element is preferably rigid. In one embodiment, both the first layer element and the second layer element are rigid. The expression "rigid" means that the first or second, or both, layer element(s) is(are) non-flexible (i.e. stiff). I.e. the first or the second, or both, layer element(s), when in solid state, does(do) not return in original shape when deformed using force, e.g. compression, impact or bending force. For instance, glass element and polycarbonate (PC) polymer element are rigid elements. I.e. if bended or when broken due to use of impact force, then would break to pieces. E.g. in case of conventional window glass, the at least part of the glass pieces would normally fall apart (down).

The first layer element and the second layer element of the layer element (LE) can be same or different and comprise a glass layer element or a polymeric layer element. In one embodiment the first layer element and the second layer element are of the same material. Glass layer element of the first layer element and of the second layer element can be of any conventional glass material. Preferably, the glass layer element comprises, preferably consists of, one of, without limitation, window glass, plate glass, silicate glass, sheet glass, float glass, coloured glass or specialty glass such as alumina-silicate glass, High-Ion Exchange (HIE™) glass, soda-lime glass, borosilicate glass or ceramic glass.

The polymeric layer element of the first layer element and the second layer element can comprise a polycarbonate (PC) polymer, an acrylic, a polyacrylate, a cyclic polyolefin, such as ethylene norbornene, metallocene-catalysed polystyrene and mixtures of two or more of these materials.

The Multilayer Element (LE)

The expression "adhering contact" is defined herein in that the surface of the interlayer element of the invention and the surface of the first layer element facing towards each other and the surface of the interlayer element of the invention and the surface of the second layer element facing towards each other are in adhering contact to each other either directly or via an adhesive layer.

The expression "adhesive layer" means a layer which is different from the interlayer element and which have different polymer composition than the polymer composition of the invention of the interlayer element. Moreover the adhesive layer is usually a continuous or discontinuous and known as hot melt adhesive, which has a well-known meaning in the prior art. Such adhesive layers have only enhancing adhering function, not the adhering function as defined for the interlayer element to keep the integrity of the first and the second layer elements.

More preferably, the surface of the interlayer element of the invention and the surface of the first layer element facing towards each other and the surface of the interlayer element of the invention and the surface of the second layer element facing towards each other are in direct contact to each other without any additional adhesive layers in between. FIG. 2 illustrates this most preferable embodiment.

Preferably there are no additional layers between the contacting surfaces of first layer element and the inter layer element and, respectively, between the contacting surfaces of the second layer element and the inter layer element, and the interlayer element is preferably a monolayer element.

The multilayer element (LE) is preferably transparent. The term "transparent" means herein that the multilayer element (LE) allows light to pass 100% or less through the multilayer element (LE) so that objects behind can be distinctly seen or at least outlined.

The transparency of the multilayer element (LE) can look like seen through a normal glass window. The multilayer element (LE) covers additionally the embodiments where the multilayer element (LE) is tinted (coloured) or otherwise designed as regards to appearance. Such tinted multilayer element (LE) can be treated in known manner so that the multilayer element (LE) is transparent from both sides or only from one side. Examples such tinted multilayer elements (LE) are articles, like tinted (coloured) glass door elements, tinted window elements in buildings or tinted window elements in vehicles, like cars.

The thickness of the first layer, second layer and interlayer element of the multilayer element (LE), as well as the thickness of the final multilayer element (LE), can vary depending on the desired end application, as evident for a skilled person. For instance, the thickness of the first and second layer element can be within the ranges typically used in the prior art in the respective end application. The thickness of the interlayer element can also be chosen by the skilled person for the respective end application. As an example only thickness of the interlayer element can be in the range from 0.03 to 3.0 mm, like from 0.1 to 2.5 mm, such as from 0.2 to 2 mm. The exemplified thickness of the interlayer element most preferably is a monolayer element of one or two or more layers as defined above, wherein the layer(s) consist(s) of the polymer composition of the interlayer of the invention.

The invention further provides the use of the polymer composition as defined above or in claims for producing a multilayer element (LE) of the invention.

The invention further provides a process for producing the multilayer element (LE) of the invention, wherein the process comprises the steps of
assembling the first layer element, interlayer element and the second layer element to a multilayer assembly;
laminating the layers of the multilayer assembly at elevated temperature and optionally at vacuum conditions to obtain multilayer element (LE); and
recovering the obtained multilayer element (LE).

The lamination step is typically carried out in two steps, in pre-lamination step and then in final lamination step. In pre-lamination step any air bubbles are removed between the layer elements of the multilayer (LE) assembly. Air removal can be effected for instance by rolling press process or by vacuum process. The vacuum process can be carried out e.g. in so-called vacuum bag process or vacuum-ring process. The final lamination is carried out at elevated temperature and optionally, and preferably, under vacuum.

The lamination process/conditions and equipment are well known in the art, and can be chosen by a skilled person depending on the final end article of the multilayer element (LE). Moreover, the pre-lamination and final lamination steps are typically carried out in the same lamination process.

The interlayer element of the multilayer element (LE) may be, and preferably is, crosslinked as described above or in claims. In this embodiment the crosslinking agent is typically present in the polymer composition before the lamination step. For instance, the crosslinking agent can be present in the polymer composition of the interlayer element of the invention at time of producing the interlayer element or during the production process, e.g. lamination process, of the multilayer element (LE). The crosslinking typically occurs during or after, or continues after, the lamination process, depending on the used crosslinking agent.

Preferably, the polymer composition including a crosslinking agent selected from a peroxide or a silanol condensation catalyst (SCC) both as defined above is extruded at a temperature below the decomposition temperature of said peroxide or the crosslinking temperature of said silanol condensation catalyst (SCC), preferably of said peroxide, to form a crosslinkable interlayer element.

Subsequently, the laminating step is preferably performed at a temperature higher than the decomposition temperature of said peroxide or at a temperature at or above the crosslinking temperature of said silanol condensation catalyst (SCC).

As a consequence, the polymer composition of the crosslinkable interlayer element is preferably crosslinked.

In a specific embodiment the present invention relates to a laminated glass layer element (GLE) comprising a first glass layer element, an interlayer element and a second glass layer element, in the given order, wherein
the interlayer element comprises a polymer composition comprising a copolymer of ethylene (a) which is selected from
  (a1) a copolymer of ethylene with silane group(s) containing comonomer; or
  (a2) a copolymer of ethylene with one or more polar comonomer(s) selected from (C1-C6)-alkyl acrylate or (C1-C6)-alkyl (C1-C6)-alkylacrylate comonomer(s), which copolymer (a2) bears silane group(s) containing units and which copolymer (a2) is different from the copolymer (a1); and
the interlayer element is in adhering contact with said first glass layer element and said second glass layer element.

Thereby, the laminated glass layer element (GLE) includes all embodiments of the multilayer element (LE) with the specification that the first and second elements are glass layer elements.

Further, the first glass layer element and the second glass layer element include all embodiments as defined above and below for the first and second layer element when specified as glass layer elements.

The interlayer element and the polymer composition include all embodiments as defined above and below.

Preferably, the interlayer element of the laminated glass layer element (GLE) is crosslinked as described above or below. Preferably the interlayer element of the laminated glass layer element (GLE) is crosslinked using peroxide.

The multilayer element (LE), like the preferable laminated glass layer element (GLE), including the crosslinked interlayer element shows preferably good optical properties such as low haze in addition to a consistent adhesion between the layers of the multilayer element (LE) and good quality to the multilayer element (LE), preferably to final laminated glass layer element (GLE), which prolongs the life of the end article as discussed above for the multilayer element (LE).

FIG. 2 illustrates the most preferable embodiment of the layer element (LE) of the invention, wherein the surface of the interlayer layer element (i) facing the surface of the first layer element (1) are in direct contact with each other and preferably without any adhesive layer(s) in between; and, on the opposite side of the interlayer element (i), the surface of the interlayer layer element (i) facing the surface of the second layer element (2) are in direct contact with each other and preferably without any adhesive layer(s) in between.

The multilayer element (LE) and the laminated glass layer element (GLE) can be used for building and construction applications, architectural glasses, interior/exterior design applications as described above, below or in claims.

In one preferable embodiment the present invention is directed to a multilayer element (LE) for use in a safety layer element, an insulation layer element or a thermal layer element, or in any combination thereof, wherein the multilayer element (LE) comprises a first layer element, an interlayer element and a second layer element, in the given order, wherein the first layer element comprises a glass layer or a polymeric layer;

the interlayer element comprises a polymer composition comprising a copolymer of ethylene (a) which is selected from (a1) a copolymer of ethylene with silane group(s) containing comonomer; or (a2) a copolymer of ethylene with one or more polar comonomer(s) selected from (C1-C6)-alkyl acrylate or (C1-C6)-alkyl (C1-C6)-alkylacrylate comonomer(s), which copolymer (a2) bears silane group(s) containing units and which copolymer (a2) is different from the copolymer (a1); and the second layer element comprises a glass layer or a polymeric layer;

and wherein the interlayer element is in adhering contact with said first and second layer element.

An Article Comprising the Multilayer Element (LE)

The invention further provides the use of the multilayer element (LE) as defined above, below or in claims or the laminated glass element (GLE) as defined above, below or in claims for producing an article comprising the multilayer element (LE) or the laminated glass layer element (GLE), for construction applications, like elements in buildings, for instance architectural elements, such as exterior/interior elements, like facades outside the building, window elements, door elements or indoor wall elements etc.; for elements in bridges; for elements in vehicles, such as windows etc. in cars, trains, airplanes or ships; for elements in production equipments, like safety windows in machines etc.; for elements in household devices; for projection applications, like head-up displays, or for elements in furniture etc.; not limiting to above mentioned applications.

The invention further provides an article comprising the multilayer element (LE) of the invention.

The article can be for any application, like article for construction applications, like elements in buildings, for instance architectural elements, such as exterior/interior elements, like facades outside the building, window elements, door elements or indoor wall elements etc.; for elements in bridges; for elements in vehicles, such as windows etc. in cars, trains, airplanes or ships; for elements in production equipments, like safety windows in machines etc.; for elements in production equipments, like safety windows in machines; for elements in household devices; for projection applications, like head-up displays, or for elements in furniture etc.; not limiting to above mentioned applications, comprising the multilayer element (LE) as defined above, below or in claims or the laminated glass element (GLE) as defined above, below or in claims.

The article of the invention can also be e.g. a construction element with integrated photovoltaics functionality. In this context, the article is part of the construction element and not a separate photovoltaic module device installed separately to the building, like on the roof of a building. I.e. the article of the invention is an integrated part of the construction element like wall or window of the building. Accordingly and preferably, the multilayer element (LE), the laminated glass element (GLE) or the article of the invention is not part of a Photovoltaic module device which comprises a front protective layer element, a front encapsulation layer element, a photovoltaic element, a rear encapsulation element and a protective backsheet element and which is produced as a separate article and installed as separate unit to a construction element.

In one preferable embodiment, the article is for applications wherein one or more of the safety, insulation or thermal properties are desired. As non-limiting example of such articles comprising the multilayer element (LE) or laminated glass element (GLE), as defined above, below or in claims, are e.g. articles for construction applications, like elements in buildings, for instance architectural elements, such as outdoor wall elements (i.e. facades outside the building), or indoor wall elements, window elements, door elements, etc.; for elements in bridges; for elements in vehicles (windows in cars, trains, airplanes, ships etc.); for elements in production equipments, like safety windows in machines; for elements in production equipments, like safety windows in machines; for elements in household devices; for projection applications, like head-up displays, or for elements in furniture etc.

One example of the article, as defined above, below or in claims, is for instance selected from a safety layer element, an insulation layer element or a thermal layer element, or any combination thereof. Preferably, in this embodiment of the article, the safety layer element, the insulation layer element or the thermal layer element, or any combination thereof, consists of the layer element (LE).

In one preferable embodiment the article is a multilayer element (LE) which is a safety element, like safety glass, such as safety glass window element; a safety glass indoor or outdoor door element; a safety glass outdoor (facade) or indoor wall element of a building; or safety glass window in a vehicle, like in a car. The term "safety glass" covers herein the options where the first or second layer element material, or both, is/are glass or a polymeric material. In this embodiment the article is preferably a multilayer element (LE), preferably a glass laminate element (GLE), which is a safety layer element, preferably a safety glass element, comprising, wherein at least one of first and second layer element of the layer element preferably comprises, preferably consists of, a glass layer. More preferably, in this embodiment, both the first and second layer element comprises, preferably consists of, a glass layer. More preferably, in this embodiment, the interlayer element is a monolayer element consisting of the polymer (a) of the invention.

The invention further provides a process for producing an article comprising the multilayer element (LE), wherein the process comprises the steps of a) producing a multilayer element (LE) by
assembling the first layer element, interlayer element and the second layer element to a multilayer assembly;
laminating the layers of the multilayer assembly at elevated temperature and optionally at vacuum conditions to obtain multilayer element (LE); and
recovering the article comprising the obtained multilayer element (LE) of the invention.

In one embodiment of the invention, the process for producing an article of the invention comprises the steps of
assembling the first layer element, like glass layer element, the interlayer element of the invention and the second layer element, like glass layer element, to a multilayer element (LE) assembly;

subjecting the obtained assembly to so-called pre-lamination step to remove any air bubbles;

subjecting the obtained pre-laminated multilayer element (LE) to heat and pressure to obtain the multilayer element (LE); and recovering the article comprising the obtained multilayer element (LE) of the invention.

Preferably, the process for producing an article of the invention further comprises the steps of extruding the polymer composition together with a crosslinking agent selected from a peroxide or a silanol condensation catalyst (SCC) at a temperature below the decomposition temperature of said peroxide or below the crosslinking temperature of said silanol condensation catalyst (SCC) to form a crosslinkable interlayer element;

performing the lamination step at a temperature higher than the decomposition temperature of said peroxide or at a temperature at or above the crosslinking temperature of said silanol condensation catalyst (SCC); and crosslinking the polymer composition of said crosslinkable interlayer element.

Determination Methods

Melt Flow Rate: The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is measured at a temperature 230° C. and a load of 2.16 kg. The $MFR_2$ of polyethylene is measured at a temperature 190° C. and a load of 2.16 kg.

Density: ISO 1183, measured on compression moulded plaques.

Comonomer Contents

The content (wt % and mol %) of polar comonomer present in the polymer (a) and the content (wt % and mol %) of silane group(s) containing units (preferably comonomer) present in the polymer (a):

Quantitative nuclear-magnetic resonance (NMR) spectroscopy was used to quantify the comonomer content of the polymer composition or polymer as given above or below in the context.

Quantitative $^1$H NMR spectra recorded in the solution-state using a Bruker Advance III 400 NMR spectrometer operating at 400.15 MHz. All spectra were recorded using a standard broad-band inverse 5 mm probehead at 100° C. using nitrogen gas for all pneumatics. Approximately 200 mg of material was dissolved in 1,2-tetrachloroethane-$d_2$ (TCE-$d_2$) using ditertiarybutylhydroxytoluen (BHT) (CAS 128-37-0) as stabiliser. Standard single-pulse excitation was employed utilising a 30 degree pulse, a relaxation delay of 3 s and no sample rotation. A total of 16 transients were acquired per spectra using 2 dummy scans. A total of 32k data points were collected per FID with a dwell time of 60 µs, which corresponded to to a spectral window of approx. 20 ppm. The FID was then zero filled to 64k data points and an exponential window function applied with 0.3 Hz line-broadening. This setup was chosen primarily for the ability to resolve the quantitative signals resulting from methylacrylate and vinyltrimethylsiloxane copolymerisation when present in the same polymer.

Quantitative $^1$H NMR spectra were processed, integrated and quantitative properties determined using custom spectral analysis automation programs. All chemical shifts were internally referenced to the residual protonated solvent signal at 5.95 ppm.

When present characteristic signals resulting from the incorporation of vinylacytate (VA), methyl acrylate (MA), butyl acrylate (BA) and vinyltrimethylsiloxane (VTMS), in various comonomer sequences, were observed (Randell89). All comonomer contents calculated with respect to all other monomers present in the polymer.

The vinylacytate (VA) incorporation was quantified using the integral of the signal at 4.84 ppm assigned to the *VA sites, accounting for the number of reporting nuclei per comonomer and correcting for the overlap of the OH protons from BHT when present:

$$VA=(I_{*VA}-(I_{ArBHT})/2)/1$$

The methylacrylate (MA) incorporation was quantified using the integral of the signal at 3.65 ppm assigned to the 1MA sites, accounting for the number of reporting nuclei per comonomer:

$$MA=I_{1mA}/3$$

The butylacrylate (BA) incorporation was quantified using the integral of the signal at 4.08 ppm assigned to the 4BA sites, accounting for the number of reporting nuclei per comonomer:

$$BA=I_{4BA}/2$$

The vinyltrimethylsiloxane incorporation was quantified using the integral of the signal at 3.56 ppm assigned to the 1VTMS sites, accounting for the number of reporting nuclei per comonomer:

$$VTMS=I_{1VTMS}/9$$

Characteristic signals resulting from the additional use of BHT as stabiliser, were observed. The BHT content was quantified using the integral of the signal at 6.93 ppm assigned to the ArBHT sites, accounting for the number of reporting nuclei per molecule:

$$BHT=I_{ArBHT}/2$$

The ethylene comonomer content was quantified using the integral of the bulk aliphatic (bulk) signal between 0.00-3.00 ppm. This integral may include the 1VA (3) and αVA (2) sites from isolated vinylacetate incorporation, *MA and αMA sites from isolated methylacrylate incorporation, 1BA (3), 2BA (2), 3BA (2), *BA (1) and αBA (2) sites from isolated butylacrylate incorporation, the *VTMS and αVTMS sites from isolated vinylsilane incorporation and the aliphatic sites from BHT as well as the sites from polyethylene sequences. The total ethylene comonomer content was calculated based on the bulk integral and compensating for the observed comonomer sequences and BHT:

$$E=(\tfrac{1}{4})*[I_{bulk}-5*VA-3*MA-10*BA-3*VTMS-21*BHT]$$

It should be noted that half of the a signals in the bulk signal represent ethylene and not comonomer and that an insignificant error is introduced due to the inability to compensate for the two saturated chain ends (S) without associated branch sites. The total mole fractions of a given monomer (M) in the polymer was calculated as:

$$fM=M/(E+VA+MA+BA+VTMS)$$

The total comonomer incorporation of a given monomer (M) in mole percent was calculated from the mole fractions in the standard manner:

$$M[\text{mol \%}]=100*fM$$

The total comonomer incorporation of a given monomer (M) in weight percent was calculated from the mole fractions and molecular weight of the monomer (MW) in the standard manner:

$M[\text{wt \%}]=100*(fM*MW)/((fVA*86.09)+(fMA*86.09)+(fBA*128.17)+(fVTMS*148.23)+((1-NA-fMA-fBA-fVTMS)*28.05))$ randall89: J. Randall, Macromol. Sci., Rev. Macromol. Chem. Phys. 1989, C29, 201. If characteristic signals from other specific chemical species are observed the logic of quantification and/or compensation can be extended in a similar manor to that used for the specifically described chemical species. That is, identification of characteristic signals, quantification by integration of a specific signal or signals, scaling for the number of reported nuclei and compensation in the bulk integral and related calculations. Although this process is specific to the specific chemical species in question the approach is based on the basic principles of quantitative NMR spectroscopy of polymers and thus can be implemented by a person skilled in the art as needed.

Rheological Properties: Dynamic Shear Measurements (Frequency Sweep Measurements)

The characterisation of melt of polymer composition or polymer as given above or below in the context by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $\gamma(t)=\gamma_0 \sin(\omega t)$ (1)

If the applied strain is within the linear viscoelastic regime, the resulting sinusoidal stress response can be given by $\sigma(t)=\sigma_0 \sin(\omega t+\delta)$ (2)

where $\sigma_0$ and $\gamma_0$ are the stress and strain amplitudes, respectively
$\omega$ is the angular frequency
$\delta$ is the phase shift (loss angle between applied strain and stress response)
t is the time Dynamic test results are typically expressed by means of several different rheological functions, namely the shear storage modulus G', the shear loss modulus, G", the complex shear modulus, G*, the complex shear viscosity, $\eta^*$, the dynamic shear viscosity, $\eta'$, the out-of-phase component of the complex shear viscosity $\eta''$ and the loss tangent, tan $\delta$ which can be expressed as follows:

$G' = \frac{\sigma_0}{\gamma_0}\cos\delta \, [\text{Pa}]$ (3)

$G'' = \frac{\sigma_0}{\gamma_0}\sin\delta \, [\text{Pa}]$ (4)

$G^* = G' + iG'' \, [\text{Pa}]$ (5)

$\eta^* = \eta' - i\eta'' \, [\text{Pa.s}]$ (6)

$\eta' = \frac{G''}{\omega} \, [\text{Pa.s}]$ (7)

$\eta'' = \frac{G'}{\omega} \, [\text{Pa.s}]$ (8)

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation (9).

$EI(x)=G'$ for $(G''=x$ kPa$)$ [Pa] (9)

For example, the EI (5 kPa) is the defined by the value of the storage modulus G', determined for a value of G" equal to 5 kPa.

Shear Thinning Index ($SHI_{0.05/300}$) is defined as a ratio of two viscosities measured at frequencies 0.05 rad/s and 300 rad/s, $\mu_{0.05}/\mu_{300}$.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

Melting Temperature ($T_m$) and Heat of Fusion ($H_f$)

measured with Mettler TA820 differential scanning calorimetry (DSC) on 5 to 10 mg samples. DSC is run according to ISO 3146/part 3/method C2 in a heat/cool/heat cycle with a scan rate of 10° C./min (heating and cooling) in the temperature range of +23 to +210° C. The melting temperature and heat of fusion ($H_f$) are determined from the second heating step. The melting temperatures were taken as the peaks of endotherms.

Water Permeation

Water Permeation Measurement: was measured according to standard ISO 15106-3:2003.
Device: Mocon Aquatran
Temperature: 38° C.±0.3° C.
Relative Humidity: 0/100%
Area sample: 5 cm2

Peeling Test of Laminated Glass

Peeling speed of 840 mm/min. for all samples
Test device: Zwick Z010U-184509
Test at ambient temperature (23° C.).

Haze

The light that passes through the transparent material can be affected by irregularities within it. This causes the light to scatter in different directions giving haze. The origin of the internal haze in pure polymers is light scattering due to different refractive index of crystalline and amorphous regions in the polymer. By laminating the encapsulant between two glass slides, the direct transmittance, scattered transmittance, and reflectance is measured with an ultraviolet/visible/near infrared (UV/VIS/NIR) Perkin Elmer Lambda 900 spectrometer equipped with an integrating sphere. With an integrating sphere both the total transmittance i.e. direct transmittance+scattered transmittance and only the scattered (diffuse) transmittance can be recorded. The haze is calculated from the Equation below:

$$\text{Haze}(\lambda) = \frac{\text{diffuse transmittance}(\lambda)}{\text{total transmittance}(\lambda)} * 100\%^*$$

The Sample Preparation for Haze Measurements were Done the Following:

Test interlayer element for IE2: polymer (a) without without peroxide. Polymer (a) was used as such to produce the Test interlayer elements as described below.

Test interlayer elements for IE3 to IE7 contained polymer (a) with peroxide in amounts as given below. The peroxide used for the crosslinking Test interlayer elements of IE3 to IE7 was a tert.butylperoxy-(2-ethylhexyl) carbonate peroxide (TBPEHC), supplier United Initiators (CAS nr. 34443-12-4) with a peroxide content of ca. 99% w/w. The peroxide was soaked into the pellets of polymer (a) by tumbling 1 kg of material at a constant rate at a temperature of 30 C for 24 hours. After the peroxide soaking the material was used to produce the Test interlayer elements as described below.

Test interlayer elements were produced by extruding the material into tape samples on a Collin 15 extruder (Teach-Line E20T). The same temperature profile, 100-100-100° C., was used for producing the tape samples (Test interlayer elements). The used temperature profile was below the peroxide decomposition temperature. The tape samples (Test interlayer elements) had a thickness of 0.45 mm and a width of 40 mm.

The obtained test interlayer elements were laminated between two microscope glasses with a thickness of 1 mm. The used laminator was a commercial PEnergy L036LAB vacuum laminator. The lamination temperature for forming the Test laminates IE2 to IE7 and time and amounts of the peroxide for crosslinked samples IE3-IE7 were as follows amounts and lamination conditions. The crosslinking occurred during the lamination.

IE2: no peroxide, lamination time 2+15 min* at lamination temperature 130° C.
IE3: 1.0 wt % peroxide, lamination time 2+15 min* at lamination temperature 130° C.
IE4: 1.0 wt % peroxide, lamination time 2+5 plus 2+5 min* at lamination temperature 130° C.
IE5: 1.5 wt % peroxide, lamination time 2+5 plus 2+5 min* at lamination temperature 130° C. (gel content 75%)
IE6: 1.5 wt % peroxide, lamination time 2+15 min* at lamination temperature 125° C.
IE7: 1.5 wt % peroxide, lamination time 2+15 min* at lamination temperature 150° C.
2+15 minutes at 130° C.
The pressure during the lamination process was 300 mbar.
*2+15 minutes means: 2 minutes vacuum with no pressure and 15 minutes pressure with 300 mbar
*2+5 minutes means: 2 minutes vacuum with no pressure and 5 minutes pressure with 300 mbar Gel content (wt %): is measured according to ASTM D2765-90 using a sample consisting of said crosslinked polyolefin polymer composition of the invention (Method A, decaline extraction). Ambient conditions is 23° C., 50% room humidity (RH). The RH at 50° C. to 100° C. was about 10%, if not otherwise specified.

Experimental Part

Polymerisation Example for Producing Polymer (A) of the Polymer Composition of the Interlayer of the Layer Element (LE): Copolymer of Ethylene with Methyl Acrylate Comonomer and with Vinyl Trimethoxysilane Comonomer Polymer (a) was produced in a commercial high pressure tubular reactor at a pressure 2500-3000 bar and max temperature 250-300° C. using conventional peroxide initiator. Ethylene monomer, methyl acrylate (MA) polar comonomer and vinyl trimethoxy silane (VTMS) comonomer (silane group(s) containing comonomer) were added to the reactor system in a conventional manner. CTA was used to regulate MFR as well known for a skilled person. After having the information of the property balance desired for the inventive final polymer (a), the skilled person can control the process to obtain the polymer (a).

The amount of the vinyl trimethoxy silane units, VTMS, (=silane group(s) containing units), the amount of MA and MFR$_2$ are given in the table 1.

The properties in below tables were measured from the polymer (a) as obtained from the reactor or from a layer sample as indicated below.

TABLE 1

Product properties of the polymers (a-1), (a-2) and (a-3) used as polymer (a) in the Inventive Examples

| Properties of the polymer obtained | Test polymer | | |
|---|---|---|---|
| from the reactor | Polymer (a-1) | Polymer (a-2) | Polymer (a-3) |
| MFR$_{2,16}$, g/10 min | 4.4 | | |
| Methyl acrylate (MA) content, mol % (wt %) | 8.1 (21) | 10.0 (26) | 11.6 (30) |
| Melt Temperature, ° C. | 92 | | |
| VTMS content, mol % (wt %) | 0.41 (1.8) | | |
| Density, kg/m³ | 946 | | |
| SHI (0.05/300), 150° C. | 70 | | |

In above table 1 MA denotes the content of Methyl Acrylate comonomer present in the polymer (a) and, respectively, VTMS content denotes the content of vinyl trimethoxy silane comonomer present in the polymer (a).

Process for Glass Lamination

Inventive example 1 (IE1): The polymer (a-1) was used to produce an interlayer element between a glass element and a PET sheet. The interlayer element was formed from two film layers of 0.45 mm thickness to achieve the final interlayer thickness of 0.9 mm. Lamination of said two layers occurred during the sample lamination. The "starting" film was produced in pilot cast film extrusion line, BA60 Battenfeld film extruder, with a die width of 650 mm. The temperature settings were 50/120/130° C.: The film sample dimensions were: 580 mm width and 0.45 mm thickness.

Comparative example (CE1): As in IE1, but PVB (polyvinyl butyral): commercial Saflex® PA61, supplied by Eastman (earlier Solutia), thickness 1 mm, was used as the interlayer element.

The interlayers of IE1 and CE1 were laminated between a glass layer and PET layer. Glass layer (plate) had the following dimensions: 300×300 mm with thickness of 3.2 mm. The PET (polyethylene terephthalate) layer was used to support the peeling test and was DYMAT® PYE (PET/PET/Primer), supplied by Covme, total thickness of ca. 300 micron.

The used laminator was commercial PEnergy L036LAB vacuum laminator. The lamination conditions are given in below table 2.

TABLE 2 details of the adhesion performance between example sample and comparative one

|  | IE1 | CE1 |
|---|---|---|
| Lamination temperature, ° C. | 150 | 150 |
| Total lamination time, minutes | 10 | 20 |
| Vacuum/Press time, minutes | 4/6 | 5/15 |
| F max, N/mm | 17.2 | 2.4 |
| Standard deviation of $F_{max}$ | 0.78 | 0.09 |
| F average of 4 measurements, N/mm | 13.7 | 2.1 |
| Standard deviation of $F_{average}$ | 0.47 | 0.04 |
| Way of Failure | 50% A & | 100% A |
| A-adhesive failure | 50% K |  |
| K-cohesive failure |  |  |
| Observation by naked eye | transparent | very hazy |
| F max, N/mm | 12.3 | 0.9 |
| Standard deviation of $F_{max}$ | 0.6 | 0.06 |
| F average of 4 measurements, N/mm | 9.9 | 0.8 |
| Standard deviation of $F_{average}$ | 100% A | 100% A |

A: adhesive failure - failure happens between the interlayer and the glass plate
K: cohesive failure - failure of the interlayer itself, we can see the deposit of interlayer still on glass plate after peeling test finished FIG. 1 shows the better adhesion strength of layer element of the invention (IE1) comprising the interlayer element of the invention before and after water immersion compared to comparative layer element (CE1) comprising the prior art interlayer element (PVB).

Optical Properties of Multilayer Elements Comprising Crosslinked and Non-Crosslinked Interlayer Elements The haze performance of the inventive Test laminate samples IE2 to IE7 were measured using the Haze determination method as described above under Determination methods. The preparation of the Test laminate samples IE2 to IE7 was carried out as described above in Haze method description under Determination methods.

FIG. 3 shows the haze % as function of wavelength (nm) of laminate samples IE2 to IE4, wherein IE2 was not crosslinked and IE3 and IE4 were crosslinked in the presence of 1.0 wt % peroxide and also the lamination conditions were varied.

FIG. 4 shows the haze % as function of wavelength (nm) of laminate samples IE2 and IE5 to IE7, wherein IE2 was not crosslinked and IE5 to IE7 were crosslinked in the presence of 1.5 wt % peroxide and also the lamination conditions were varied. The data given in the figures show that the haze performance (low haze) of the composition of the interlayer element of the invention and the multilayer element (LE) of the invention is highly feasible for producing articles for versatile end applications wherein good optical properties, like low haze, are desired. Said haze performance can be further improved by crosslinking the composition, preferably by crosslinking at least the Polymer (a), of the interlayer element of the multilayer element (LE) of the invention.

The invention claimed is:

1. A multilayer element (LE) comprising a first layer element, an interlayer element and a second layer element, wherein
   the first layer element comprises a glass layer or a polymeric layer;
   the interlayer element comprises a polymer composition comprising a copolymer of ethylene (a) which is selected from the group consisting of
      (a2) a copolymer of ethylene with one or more polar comonomer(s) selected from (C1-C6)-alkyl acrylate or (C1-C6)-alkyl (C1-C6)-alkylacrylate comonomer (s), which copolymer (a2) bears silane group(s) containing units,
   wherein the copolymer of ethylene (a) has a melt flow rate, $MFR_2$, of from 2.0 to 8 g/10 min, determined according to ISO 1133 at 190° C. and a load of 2.16 kg, and a melting temperature of from 70° C. to 110° C., determined according to ASTM D3418; and
   the second layer element comprises a glass layer element or a polymeric layer element;
   and wherein the interlayer element is in adhering contact with said first and second layer element, and wherein the interlayer element has a thickness of 0.03 mm to 3.0 mm.

2. The multilayer element (LE) according to claim 1, wherein the copolymer of ethylene (a) is selected from
   (a2) a copolymer of ethylene with one or more polar comonomer(s) selected from (C1-C6)-alkyl acrylate or (C1-C6)-alkyl (C1-C6)-alkylacrylate comonomer(s) and with silane group(s) containing comonomer.

3. The multilayer element (LE) according to claim 1, wherein the polar comonomer is present in the copolymer of ethylene (a2) in an amount of 0.5 to 30.0 mol %.

4. The multilayer element (LE) according to claim 1, the silane group(s) containing unit is a hydrolysable unsaturated silane compound represented by the formula (I):

$$R^1SiR^2_qY_{3-q} \quad (I)$$

wherein
   $R^1$ is an ethylenically unsaturated hydrocarbyl, hydrocarbyloxy or (meth)acryloxy hydrocarbyl group,
   each $R^2$ is independently an aliphatic saturated hydrocarbyl group,
   Y which is/are the same or different, is a hydrolysable organic group and
   q is 0, 1 or 2.

5. The multilayer element (LE) according to claim 1, wherein the polar comonomer is present in the copolymer of ethylene (a2) in an amount of 2.5 to 18 mol %.

6. The multilayer element (LE) according to claim 1, wherein the polymer composition of the interlayer element is crosslinked.

7. The multilayer element (LE) according to claim 1, wherein interlayer element is the sole polymeric layer element between the first and second layer element.

8. The multilayer element (LE) according to claim 1, wherein the multilayer element is transparent.

9. A laminated glass layer element (GLE) comprising a first glass layer element, an interlayer element and a second glass layer element, in the given order, wherein
the interlayer element comprises a polymer composition comprising a copolymer of ethylene (a) which is selected from the group consisting of
(a2) a copolymer of ethylene with one or more polar comonomer(s) selected from (C1-C6)-alkyl acrylate or (C1-C6)-alkyl (C1-C6)-alkylacrylate comonomer (s), which copolymer (a2) bears silane group(s) containing units,
wherein the copolymer of ethylene (a) has a melt flow rate, $MFR_2$, of from 2.0 to 8 g/10 min, determined according to ISO 1133 at 190° C. and a load of 2.16 kg, and a melting temperature of from 70° C. to 110° C., determined according to ASTM D3418; and
the interlayer element is in adhering contact with said first glass layer element and said second glass layer element, and wherein the interlayer element has a thickness of 0.03 mm to 3.0 mm.

10. A process comprising producing an article comprising a multilayer element (LE) or a laminated glass layer element (GLE), for construction applications, elements in bridges, elements in vehicles, elements in production equipments, elements in household devices, projection applications, or elements in furniture,
wherein the multilayer element (LE) comprises a first layer element, an interlayer element and a second layer element, wherein
the first layer element comprises a glass layer or a polymeric layer;
the interlayer element comprises a polymer composition comprising a copolymer of ethylene (a) which is selected from the group consisting of
(a2) a copolymer of ethylene with one or more polar comonomer(s) selected from (C1-C6)-alkyl acrylate or (C1-C6)-alkyl (C1-C6)-alkylacrylate comonomer(s), which copolymer (a2) bears silane group(s) containing units, wherein the copolymer of ethylene (a) has a melt flow rate, $MFR_2$, of from 2.0 to 8 g/10 min, determined according to ISO 1133 at 190° C. and a load of 2.16 kg, and a melting temperature of from 70° C. to 110° C., determined according to ASTM D3418; and
the second layer element comprises a glass layer element or a polymeric layer element;
and wherein the interlayer element is in adhering contact with said first and second layer element;
wherein the laminated glass layer element (GLE) comprises a first glass layer element, an interlayer element and a second glass layer element, in the given order, wherein
the interlayer element comprises a polymer composition comprising a copolymer of ethylene (a) which is selected from the group consisting of
(a2) a copolymer of ethylene with one or more polar comonomer(s) selected from (C1-C6)-alkyl acrylate or (C1-C6)-alkyl (C1-C6)-alkylacrylate comonomer(s), which copolymer (a2) bears silane group(s) containing units, wherein the copolymer of ethylene (a) has a melt flow rate, $MFR_2$, of from 2.0 to 8 g/10 min, determined according to ISO 1133 at 190° C. and a load of 2.16 kg, and a melting temperature of from 70° C. to 110° C., determined according to ASTM D3418; and
the interlayer element is in adhering contact with said first glass layer element and said second glass layer element,
wherein the interlayer element has a thickness of 0.03 mm to 3.0 mm, wherein producing the article comprises the step of
a) producing a multilayer element (LE) by
assembling the first layer element, interlayer element and the second layer element to a multilayer assembly;
laminating the layers of the multilayer assembly at elevated temperature and optionally at vacuum conditions to obtain a multilayer element (LE); and
recovering the article comprising the obtained multilayer element (LE) or
a-1) producing a laminated glass element (GLE) by
assembling the first glass layer element, interlayer element and the second glass layer element to a multilayer assembly;
laminating the layers of the multilayer assembly at elevated temperature and optionally at vacuum conditions to obtain a laminated glass element (GLE); and
recovering the article comprising the laminated glass element (GLE).

11. A process for producing a multilayer element (LE) or a laminated glass element (GLE),
wherein the multilayer element (LE) comprises a first layer element, an interlayer element and a second layer element, wherein
the first layer element comprises a glass layer or a polymeric layer;
the interlayer element comprises a polymer composition comprising a copolymer of ethylene (a) which is selected from the group consisting of
(a2) a copolymer of ethylene with one or more polar comonomer(s) selected from (C1-C6)-alkyl acrylate or (C1-C6)-alkyl (C1-C6)-alkylacrylate comonomer(s), which copolymer (a2) bears silane group(s) containing units,
wherein the copolymer of ethylene (a) has a melt flow rate, $MFR_2$, of from 2.0 to 8 g/10 min, determined according to ISO 1133 at 190° C. and a load of 2.16 kg, and a melting temperature of from 70° C. to 110° C., determined according to ASTM D3418; and
the second layer element comprises a glass layer element or a polymeric layer element;
and wherein the interlayer element is in adhering contact with said first and second layer element;
wherein the laminated glass layer element (GLE) comprises a first glass layer element, an interlayer element and a second glass layer element, in the given order, wherein
the interlayer element comprises a polymer composition comprising a copolymer of ethylene (a) which is selected from the group consisting of
(a2) a copolymer of ethylene with one or more polar comonomer(s) selected from (C1-C6)-alkyl acrylate or (C1-C6)-alkyl (C1-C6)-alkylacrylate comonomer(s), which copolymer (a2) bears silane group(s) containing units,
wherein the copolymer of ethylene (a) has a melt flow rate, $MFR_2$, of from 2.0 to 8 g/10 min, determined according to ISO 1133 at 190° C. and a load of 2.16 kg, and a melting temperature of from 70° C. to 110° C., determined according to ASTM D3418; and the interlayer element is in adhering contact with said first glass layer element and said second glass layer element, and wherein the process comprises the steps of assembling the first layer element, interlayer element and the second layer element to a multilayer assembly;

laminating the layers of the multilayer assembly at elevated temperature and optionally at vacuum conditions to obtain multilayer element (LE) or the laminated glass element (GLE); and recovering the obtained multilayer element (LE) or the laminated glass element (GLE), wherein the interlayer element has a thickness of 0.03 mm to 3.0 mm.

12. The process according to claim 11 further comprising the steps of:

extruding the polymer composition together with a crosslinking agent selected from a peroxide or a silanol condensation catalyst (SCC) at a temperature below the decomposition temperature of said peroxide or below the crosslinking temperature of said silanol condensation catalyst (SCC) to form a crosslinkable interlayer element;

performing the lamination step at a temperature higher than the decomposition temperature of said peroxide or at a temperature at or above the crosslinking temperature of said silanol condensation catalyst (SCC); and crosslinking the polymer composition of said crosslinkable interlayer element.

13. The process according to claim 10 further comprising the steps of:

extruding the polymer composition together with a crosslinking agent selected from a peroxide or a silanol condensation catalyst (SCC) at a temperature below the decomposition temperature of said peroxide or below the crosslinking temperature of said silanol condensation catalyst (SCC) to form a crosslinkable interlayer element;

performing the lamination step at a temperature higher than the decomposition temperature of said peroxide or at a temperature at or above the crosslinking temperature of said silanol condensation catalyst (SCC); and crosslinking the polymer composition of said crosslinkable interlayer element.

14. The multilayer element (LE) according to claim 3, wherein the polar comonomer is selected from (C1-C6)-alkyl acrylate comonomer.

15. The multilayer element (LE) according to claim 4, wherein the amount of the silane group(s) containing unit is of 0.01 to 2.0 mol %.

16. The multilayer element (LE) according to claim 4, wherein the copolymer of ethylene (a1) and the copolymer of ethylene (a2) are produced by polymerisation in a high pressure polymerisation process using a radical initiator.

* * * * *